US008771634B1

(12) United States Patent
Becker et al.

(10) Patent No.: US 8,771,634 B1
(45) Date of Patent: Jul. 8, 2014

(54) GENERATION OF HYDROGEN GAS FROM A BOROHYDRIDE AT A CONSTANT TEMPERATURE USING THE PHASE TRANSITION OF A HYDRATE

(75) Inventors: Carol A. Becker, Del Mar, CA (US); Brandon J. Wiedemeier, San Diego, CA (US); Jeffrey M. Lloyd, San Diego, CA (US); Jack Y. Dea, San Diego, CA (US); Rosteslaw M. Husar, El Cajon, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1029 days.

(21) Appl. No.: 12/835,477

(22) Filed: Jul. 13, 2010

(51) Int. Cl.
*C01B 3/04* (2006.01)
(52) U.S. Cl.
USPC .......................... 423/644; 206/0.7; 423/658.2
(58) Field of Classification Search
USPC .................. 206/0.7; 423/648.1, 657, 658.2; 420/900
See application file for complete search history.

(56) References Cited

U.S. PATENT DOCUMENTS

| | | | |
|---|---|---|---|
| 2,569,977 A | 10/1951 | Dickinson | |
| 4,123,813 A | 11/1978 | Adams | |
| 4,433,638 A | 2/1984 | Ashline | |
| 4,861,297 A | 8/1989 | Warnan et al. | |
| 5,231,952 A | 8/1993 | Tenniswood | |
| 6,653,005 B1 | 11/2003 | Muradov | |
| 2004/0071630 A1* | 4/2004 | Jorgensen | 423/648.1 |
| 2006/0257313 A1* | 11/2006 | Cisar et al. | 423/648.1 |

FOREIGN PATENT DOCUMENTS

WO 2006/104607 A2 10/2006

* cited by examiner

*Primary Examiner* — Stanley Silverman
*Assistant Examiner* — Syed Iqbal
(74) *Attorney, Agent, or Firm* — SPAWAR Systems Center Pacific; Kyle Eppele; J. Eric Anderson (57) ABSTRACT

The present subject matter provides heat management while generating hydrogen gas from a hydride achieved by coupling a hydride with a hydrate. The present subject matter unexpectedly provides improved methods so that the heat released by the hydride during hydrolysis is accurately balanced by the heat absorbed by the hydrate as the hydrate undergoes a phase transition to a less hydrated or to an anhydrous form. Examples of heat-moderated hydrogen generating systems are provided, and include, among others: $NaBH_4/Na_2SO_4.10H_2O$, $NaBH_4/CoSO_4.7H_2O$, and $NaBH_4/FeSO_4.7H_2O$. The subject matter provides a methodology for determining the correct proportions of hydride/hydrate to use in preparing a hydrogen generator capable of operating at a nearly constant temperature at or near a phase transition temperature of the hydrate or at a higher temperature that is still within a desired temperature range, such as, for example, 30-90° C.

21 Claims, 5 Drawing Sheets

ND OF HYDROGEN GAS FROM A
BOROHYDRIDE AT A CONSTANT
TEMPERATURE USING THE PHASE
TRANSITION OF A HYDRATE

FEDERALLY-SPONSORED RESEARCH AND DEVELOPMENT

This invention is assigned to the United States Government. Licensing inquiries may be directed to Office of Research and Technical Applications, Space and Naval Warfare Systems Center Pacific, Code 72120, San Diego, Calif., 92152; telephone 619 553 2778; email: T2@spawar.navy.mil. Reference Navy Case No. 100093.

CROSS-REFERENCE TO RELATED APPLICATIONS

This application and U.S. patent application Ser. No. 12/835,435, filed 13 Jul. 2010, (Navy Case 100081) share some common material and are commonly assigned. The aforementioned U.S. patent application Ser. No. 12/835,435 is incorporated herein by reference in its entirety.

BACKGROUND

This disclosure relates to hydrogen generation systems, and generating hydrogen gas from a hydride at moderated temperatures using a hydrate.

SUMMARY

A hydrogen generator system comprising a hydride/hydrate combination is disclosed wherein the temperature of the system is kept at or near a constant temperature at or near a selected phase transition temperature of the hydrate during the generation of hydrogen gas during the hydrolysis of the hydride. A method for generating hydrogen gas from a hydrogen source composition at a predefined temperature range comprising: selecting at least one hydride and at least one hydrate; determining the number of water molecules that can be removed from the hydrate at or below the predefined temperature range; calculating the total heat of dehydration involved in removing the water molecules from the hydrate at or below the predefined temperature range; calculating the total heat of hydrolysis involved in removing the hydrogen from the hydride during hydrolysis; calculating the relative amounts of reactant hydride and reactant hydrate needed to balance the total heat evolved by the dehydration reaction and total heat used by the hydrolysis reaction; combining the at least one hydride and at least one hydrate in the relative amounts calculated for balancing the heats of dehydration and hydrolysis; and generating hydrogen gas.

DETAILED DESCRIPTION

Compositions and methods for generating hydrogen gas have been gaining interest in recent years, especially for using hydrogen as an alternative fuel source. Hydrides, such as metal hydrides, are a common source of hydrogen gas. However, hydrolysis of hydrides to form hydrogen gas generally involves the generation of runaway high temperatures and volatile chemical reactions. Accordingly, compositions and methods are needed that do not produce runaway high temperatures and volatile chemical reactions.

Previously, Cisar et al. in WO2006104607, "Hydrolysis of Chemical Hydrides Utilizing Hydrated Compounds," suggested using hydride/hydrate compositions and methods to produce hydrogen at moderated temperatures, wherein the hydrate absorbs the heat released by the hydrolysis of the hydride. Importantly, however, Cisar et al. does not provide any working examples for generating hydrogen gas from a hydride at moderated temperatures, and employs a methodology that is different from the present subject matter described herein. In particular, the present subject matter uses a methodology significantly different from Cisar et al. to determine the heat absorbed by a hydrate in a hydride/hydrate system. As described below, the present subject matter provides working examples of a composition and method for generating hydrogen gas from a hydride at moderated temperatures.

Thus, there remains a need in the art for compositions and methods for generating hydrogen gas from a hydride at moderated temperatures.

The present subject matter provides compositions and methods wherein hydrogen gas can be generated from hydrides at moderated temperatures and thereby improves on the science.

The present subject matter provides heat management achieved by coupling a hydrate with a hydride. The present subject matter provides actual working examples, not obtained nor enabled in prior publications, where the heat released by the hydride is absorbed by the hydrate as the hydrate undergoes a phase transition to a less hydrated or to an anhydrous form.

Previous attempts to determine the heat absorbed by a hydrate used equations which contained only the anhydrous form of the hydrate as a product, used negative heats for the dehydration reaction, and did not take into account a large factor, the heat of formation of liberated water molecules. This resulted in heats of dehydration which were negative and whose magnitude was too large by more than an order of magnitude, and led to the selection of starting proportions of hydrate/hydride that may result in runaway temperatures during hydrogen generation. Three non-limiting examples of heat-moderated hydrogen generating systems are presented herein: $NaBH_4/Na_2SO_4 \cdot 10H_2O$, $NaBH_4/CoSO_4 \cdot 7H_2O$, and $NaBH_4/FeSO_4 \cdot 7H_2O$. This disclosure provides a methodology for determining the correct proportions of hydride/hydrate to use in preparing a hydrogen generator capable of operating at a nearly constant temperature at or near a phase transition temperature of the hydrate.

For purposes of the subject matter herein, the phrase "hydrogen generator" means a chemical composition, or a device, comprising a hydrogen source composition, that liberates hydrogen gas from the hydrogen source composition on demand.

The phrase "hydrogen source composition" as used herein is defined as a chemical or chemical composition capable of evolving molecular hydrogen and thereby providing a source of hydrogen gas that may be used or stored. Various materials may be used as the hydrogen source composition for the present subject matter, and are not limited to the compounds and compositions described herein.

The term "hydride" as used herein is defined as a material capable of absorbing and desorbing hydrogen, in both the hydrogen-depleted (dehydrided) and the hydrogen-rich (hydrided) states. In a particular non-limiting embodiment, a hydride may be selected from the group consisting of alkali metal and alkaline earth hydrides, and hydrides of the group III metals, for example, hydrides of lithium, sodium, potassium, rubidium, cesium, beryllium, magnesium, calcium, aluminum, and combinations thereof. In another non-limiting embodiment, at least one hydride is selected from the group consisting of LiH, NaH, KH, RbH, CsH, $MgH_2$, and $CaH_2$. In other non-limiting embodiments, borohydrides are used as the hydride, and they advantageously contain a significant amount of hydrogen on a weight percent basis. For example, the borohydride is selected from the group consisting of lithium borohydride, sodium borohydride, and magnesium borohydride. In a particular non-limiting embodiment, at least one hydride is selected from the group consisting of $LiBH_4$, $NaBH_4$, $KBH_4$, $Mg(BH_4)_2$, $Ca(BH_4)_2$, $LiAlH_4$, $NaAlH_4$, $KAlH_4$, $Li_3AlH_6$, and $Na_3AlH_6$.

In another embodiment, the hydrogen source composition comprises one or more reactive metals. For example, lithium metal may be used as the hydrogen source as it reacts directly with water to form hydrogen gas. However, in other embodiments, group I metals react with water too vigorously to be useful.

In some embodiments, the hydrogen source composition releases hydrogen gas in an exothermic reaction upon exposure to water and a catalyst. Release of heat (exothermic reaction) is often indicated as a negative enthalpy, or negative delta H, where the negative sign indicates heat released into the surroundings.

The term "hydrate" is defined as an inorganic salt containing water molecules combined in a definite ratio as an integral part of a crystal, with the water molecules either bound to a metal center or crystallized with the metal complex. Such hydrates are also said to contain water of crystallization or water of hydration. In one embodiment, at least one hydrate is selected from the group consisting of the hydrates in Table 1:

TABLE 1

| Compound Name | Hydrate |
| --- | --- |
| Aluminum ammonium sulfate | $AlNH_4(SO_4)_2 \cdot 12\, H_2O$ |
| Aluminum fluoride | $AlF_3 \cdot 3\, H_2O$ |
| Aluminum potassium sulfate | $AlK(SO_4)_2 \cdot 12H_2O$ |
| Aluminum sulfate | $Al_2(SO_4)_3 \cdot 18H_2O$ |

TABLE 1-continued

| Compound Name | Hydrate |
| --- | --- |
| Cobalt acetate | $Co(OOCCH_3)_2 \cdot 4\, H_2O$ |
| Cobalt bromide | $CoBr_2 \cdot 6H_2O$ |
| Cobalt chloride | $CoCl_2 \cdot 6H_2O$ |
| Cobalt(II) sulfate | $CoSO_4 \cdot 7H_2O$ |
| Iron sulfate | $FeSO_4 \cdot 7H_2O$ |
| Magnesium sulfate | $MgSO_4 \cdot 7H_2O$ |
| Nickel sulfate | $NiSO4 \cdot 6H_2O$ |
| Sodium metaborate | $NaBO_2 \cdot 4H_2O$ |
| Sodium phosphate | $Na_3PO_4 \cdot 12H_2O$ |
| Sodium sulfate | $Na_2SO_4 \cdot 10H_2O$ |
| Sodium thiosulfate | $Na_2S_2O_3 \cdot 5H_2O$ |
| Copper sulfate | $CuSO_4 \cdot 5H_2O$ |
| Copper Nitrate | $Cu(NO_3)_2 \cdot 6H_2O$ |

The term "catalyst" as used herein means any reactant or reagent involved in a catalytic reaction or catalyst system. For example, a catalyst is used in catalyzing the reaction of a hydride with water. Transition metals such as one of the precious metals, or other metals such as iron, cobalt, and nickel, or combinations thereof are non-limiting examples of useful catalysts. In certain embodiments, ruthenium, ruthenium chloride or other $Ru^{3+}$ salts are useful catalysts. Soluble transition metal salts that can be reduced to pure metal by hydrides are also useful for generating finely divided metal particles that can serve as catalysts.

Incorporation of the catalyst into the reaction of the hydrogen source with water may include, but is not limited to: mixing the catalyst with the hydrogen source composition and then adding water to the mixture, or mixing the catalyst with water first and then adding the hydrogen source composition, or passing the solution of the hydrogen source composition with water over or through a structure that contains the catalyst. In additional embodiments, increasing the amount of catalyst will increase the rate of hydrogen generation, for example, see FIG. 1.

Catalyst concentrations in the hydrogen source composition can vary widely depending on the efficiency of the catalyst and hydrogen production rate desired (Brown, H. C. and Brown, C. A., "New, Highly Active Metal Catalysts for the Hydrolysis of Borohydride," J. Am. Chem. Soc., 1962, 84 (8), 1493-1494). Rates and the necessary concentration of catalyst will also vary based on the concentration of the hydrogen source that can be achieved.

The phrase "phase transition" as used herein refers to a transition from a more ordered to a less ordered state in which a solid with a larger number of attached water molecules is converted to a solid with fewer, or no, attached water molecules and a liquid. In a given hydrogen generation reaction, the temperature of the system rises until a selected dehydration temperature of the hydrate is reached wherein the system undergoes a phase transition to a less hydrated state. In some embodiments, the temperature at the selected phase transition remains constant, or within a narrow range, until the dehydration reaction is complete. If insufficient hydrate is used in a given reaction, the temperature can rise after the hydrate is depleted.

The phrase "dehydration temperature" as used herein refers to the temperature at which a water molecule (or "water of hydration") that is attached to a chemical hydrate becomes dissociated from the chemical hydrate. The phrases "phase transition temperature" and "dehydration temperature" can be used interchangeably for a particular phase transition between hydration states. Chemical hydrates may comprise one or more waters of hydration, and thus may have a different dehydration temperature associated with dissociating each of the water molecules from the hydrate. In many embodiments, one or more waters of hydration are dissociated at fairly low or moderate temperatures, such as, for example, 30-90° C., while one or more waters of hydration are not dissociated until a high dehydration temperature is reached, such as, for example, >200° C. In several embodiments, high dehydration temperatures are dangerous and/or unstable and therefore should be avoided when producing hydrogen from hydride/hydrate systems. The present subject matter allows the proper concentrations of reactants to be calculated so that hydride/hydrate systems are capable of keeping the temperature constant, or nearly constant, at the phase transition temperature of the chosen hydrate. The present subject matter also aides in designing hydride/hydrate systems which can achieve partial moderation of the temperature while still maintaining the temperature in the desired range for many applications. In some embodiments, the desired temperature is selected from a temperature ranging from 30-90° C.

In one embodiment, sodium borohydride is useful as the hydrogen generator for one or more of the following reasons: its reaction with water is generally rapid but controllable; it has a large hydrogen storage capacity per system volume; it has a long storage life; and the by-products of the reaction are relatively environmentally harmless. This chemical hydrogen generator can be used in a variety of devices and methods. For example, these devices and methods can be used in fuel cells, combustion engines, for military uses such as an expendable communications relay (ECR), and many other applications not named here. One of these applications, the ECR, consists of a balloon which can be filled with hydrogen gas from the hydrogen generator and rise from the ocean to launch payloads to altitudes of 45,000 ft or higher, particularly when satellite services become unavailable. The mechanical aspects of several embodiments of this subject matter are described in U.S. Pat. No. 8,240,602, issued 14 Aug. 2012 to Jeffrey M. Lloyd et al.

EXAMPLE 1

This example relates to identifying a methodology for calculating heats of dehydration and balancing equations for hydride/hydrate systems. Sodium borohydride has a relatively large exothermic heat of reaction and heat management techniques are necessary for applications which require a constant, or nearly constant, temperature. Cisar (WO 2006/104607A2) has suggested that heat management can be achieved by coupling the hydride with a hydrate. The concept is basically sound; however the methodology described by Cisar is fundamentally different from the methodology of the present subject matter for calculating heats of dehydration and balancing equations for hydride/hydrate combinations that result in generation of hydrogen at a moderated temperature.

WO 2006/104607 does not calculate proportions of hydride and hydrate for any of the potential systems mentioned in the publication. The methodology disclosed herein results in calculated enthalpies of dehydration that are very different from the enthalpies listed in TABLE 3 of WO 2006/104607. The methodology described herein for the present subject matter results in the calculation of proportions of hydride and hydrate that are shown to achieve a moderated reaction temperature.

Cobalt sulfate heptahydrate is an example for which the enthalpy of dehydration to the anhydrous form is given as −499.92 in TABLE 3 of WO 2006/104607:

$$CoSO_4.7H_2O \rightarrow CoSO_4 + 7H_2O(l) \quad \Delta H = -499.92 \text{ kcal/mole} \quad \text{Eq. (1)}$$

WO 2006/104607 calculated the enthalpy of dehydration as follows: $\Delta H = \Delta H_f(\text{reactant}) - \Delta H_f(\text{product}) = -712.2$ kcal/mole+212.3 kcal/mole=−499.9 kcal/mole. This calculation does not take into account a large factor, the heat of formation of the liberated water molecules. Cisar's method will be called herein "R-P, no liberated waters." The subject matter described herein does not follow this method described by Cisar et al., but uses a different method for calculating relative proportions of hydride and hydrate needed for achieving hydrogen production at a moderated temperature.

In addition to $CoSO_4.7H_2O$ discussed above, $\Delta H$'s of dehydration are given in TABLE 3 of WO 2006/104607 for the following 6 compounds: $AlNH_4(SO_4)_2.12H_2O$, $Al_2(SO_4)_3.18H_2O$, $CoCl_2.6H_2O$, $FeSO_4.7H_2O$, $MgSO_4.7H_2O$, and $NiSO_4.6H_2O$. All these $\Delta H$'s have been calculated using Cisar et al.'s "R-P, no liberated waters" methodology, and are different from the enthalpies calculated using the methods of the present subject matter.

Furthermore, Eq. (1) above, from WO 2006/104607, is not used in the methods of the present subject matter. Cobalt sulphate heptahydrate loses one water to form the hexahydrate at 41° C.; the hexahydrate loses five waters to form the monohydrate at 71° C., and the monohydrate loses its final water to form the anhydrous form at a temperature exceeding 400° C. For the purposes of the subject matter herein, the monohydride is not considered as a convenient heat absorbing material because its dehydration temperature lies outside the desired reaction temperature range, such as, for example, 30-90° C. Choosing a different equation than that in WO 2006/104607 such that the monohydrate does not lose its final water then the calculation would then be:

$$CoSO_4.7H_2O \rightarrow CoSO_4.H_2O + 6H_2O(l) \quad \Delta H = -425.2 \text{ kcal/mole} \quad \text{Eq. (2)}$$

However, it is noted that this recalculated $\Delta H$ for Eq. (2) is still not complete because it still does not account for the heat of formation of the liberated waters.

Further, it is common knowledge that enthalpies of dehydration are positive since heat must be put into the system to remove water molecules from a hydrate. To remain consistent with common knowledge, the $\Delta H$ in Eq. (2) is changed to have a positive value:

$$CoSO_4.7H_2O \rightarrow CoSO_4.H_2O + 6H_2O(l) \quad \Delta H = 425.2 \text{ kcal/mole} \quad \text{Eq. (3)}$$

Grouping Eq. (3) with the equation for the generation of hydrogen gas from sodium borohydride, we have $$NaBH_4 + 2 H_2O(l) \rightarrow NaBO_2 + 4 H_2(g) \quad \Delta H = -72.5 \text{ kcal/mole} \quad \text{Eq. (4)}$$

$$CoSO4.7H_2O \rightarrow CoSO_4.H_2O + 6H_2O(l) \quad \Delta H = 425.2 \text{ kcal/mole} \quad \text{Eq. (3)}$$

Adjusting the hydrate equation so that a net heat of reaction close to zero is obtained and adding the equations, we obtain $$NaBH_4 + 2 H_2O(l) \rightarrow NaBO_2 + 4 H_2(g) \quad \Delta H = -72.5 \text{ kcal/mole} \quad \text{Eq. (4)}$$

$$1/6 \, CoSO4.7H_2O \rightarrow 1/6 \, CoSO_4.H_2O + H_2O(l) \quad \Delta H = 70.9 \text{ kcal/mole} \quad \text{Eq. (4)}$$

$$1/6\ CoSO_4 \cdot 7H_2O + NaBH_4 + H_2O(l) \rightarrow 1/6\ CoSO_4 \cdot H_2O + NaBO_2 + 4\ H_2(g)\ \Delta H = -1.6\ \text{kcal/mole} \quad \text{Eq. (5)}$$

Note that when the heat of reaction is nearly zero, an additional mole of water as a reactant appears in the net equation. This indicates that water in addition to that provided by the hydrate is required to balance the net reaction. Eq. (5) implies that a mole ratio of 1:6 hydrate:hydride is adequate to keep the temperature of the system nearly constant. However, this example is not yet complete since it does not take into account the heat of formation of liberated waters. As a result, the calculated mole ratio of 1:6 hydrate:hydride for this example could lead to runaway system temperatures. In contrast, the methodologies of the present subject matter take into account the heat of formation of liberated waters and result in a proportion of hydrate:hydride that provides a moderated reaction temperature and a predictable method for moderating the reaction temperature of any number of selected hydride/hydrate systems.

Using the methodology described in the present subject matter, Eq. (3) must be rewritten with the correct heats of reaction that take into account the heat of formation of liberated waters:

$$NaBH_4 + 2\ H_2O(l) \rightarrow NaBO_2 + 4\ H_2(g)\ \Delta H = -72.5\ \text{kcal/mole} \quad \text{Eq. (4)}$$

$$CoSO_4 \cdot 7H_2O \rightarrow CoSO_4 \cdot H_2O + 6H_2O(l)\ \Delta H = 15.3\ \text{kcal/mole} \quad \text{Eq. (6)}$$

The $\Delta H$ for Eq. (6) was calculated from standard heats of formation obtained from published thermodynamic tables, such as, for example, Frederick Rossini et al., "Selected Values of Chemical Thermodynamic Properties Circular of the National Bureau of Standards No. 500"; US Dept Commerce, NBS (1952). The calculation of $\Delta H$ for Eq. (6) includes the heat of formation of liberated waters as follows in Table 2:

TABLE 2

| Number of moles | Component | Reactant or Product? | $\Delta H_f$ at 25° C. of each component kcal/mole | Mole adjusted $\Delta H_f$ kcal/mole | Balanced Reaction $\Delta H$ kcal/mole |
|---|---|---|---|---|---|
| 1 | $CoSO_4 \cdot H_2O$ | P | −286.4 | −286.4 | −286.4 |
| 6 | $H_2O(l)$ | P | −68.3 | −409.8 | −409.8 |
| 1 | $CoSO_4 \cdot 7H_2O$ | R | −711.6 | −711.6 | 711.6 |
|  |  |  |  |  | 15.3 |

The $\Delta H$ of Eq. (6) (15.3 kcal/mole) is divided into the $\Delta H$ of Eq. (4) (−72.5 kcal/mole) to calculate the fraction (equals about 5:1) of hydrate:hydride that should be used to reach a minimized heat of reaction. Then, adjusting the moles of hydrate using the methodology described below for $NaSO_4 \cdot 10H_2O$, the following set of equations is obtained:

$$NaBH_4 + 2\ H_2O(l) \rightarrow NaBO_2 + 4\ H_2(g)\ \Delta H = -72.5\ \text{kcal/mole}$$

$$5\ CoSO_4 \cdot 7H_2O \rightarrow 5\ CoSO_4 \cdot H_2O + 30H_2O(l)\ \Delta H = 76.5\ \text{kcal/mole} \quad \text{Eq. (4)}$$

$$5\ CoSO_4 \cdot 7H_2O + NaBH_4 \rightarrow 5\ CoSO_4 \cdot H_2O + 28H_2O(l) + NaBO_2 + 4\ H_2(g)\ \Delta H = 4\ \text{kcal/mole} \quad \text{Eq. (7)}$$

As can be seen, the ratio of hydride/hydrate is 5:1, not the 1:6 indicated in Eq. (5) following a methodology that does not take into account the heat of formation of liberated waters. Thus, the hydrate:hydride ratio calculated using the methodology of the present subject matter is about 30 times the ratio predicted by the method that does not take into account the heat of formation of liberated waters. The proportions calculated using the method that does not take into account the heat of formation of liberated waters would lead to an insufficient amount of hydrate which could lead to runaway temperatures and a volatile reaction. The net equation, Eq. (7), gives the correct proportions of hydride/hydrate to use in this example for a hydrogen generator capable of maintaining the temperature at about 71° C., the temperature at which $CoSO_4 \cdot 7H_2O$ undergoes a phase transition from the heptahydrate to the monohydrate.

EXAMPLE 2

Figure 4:
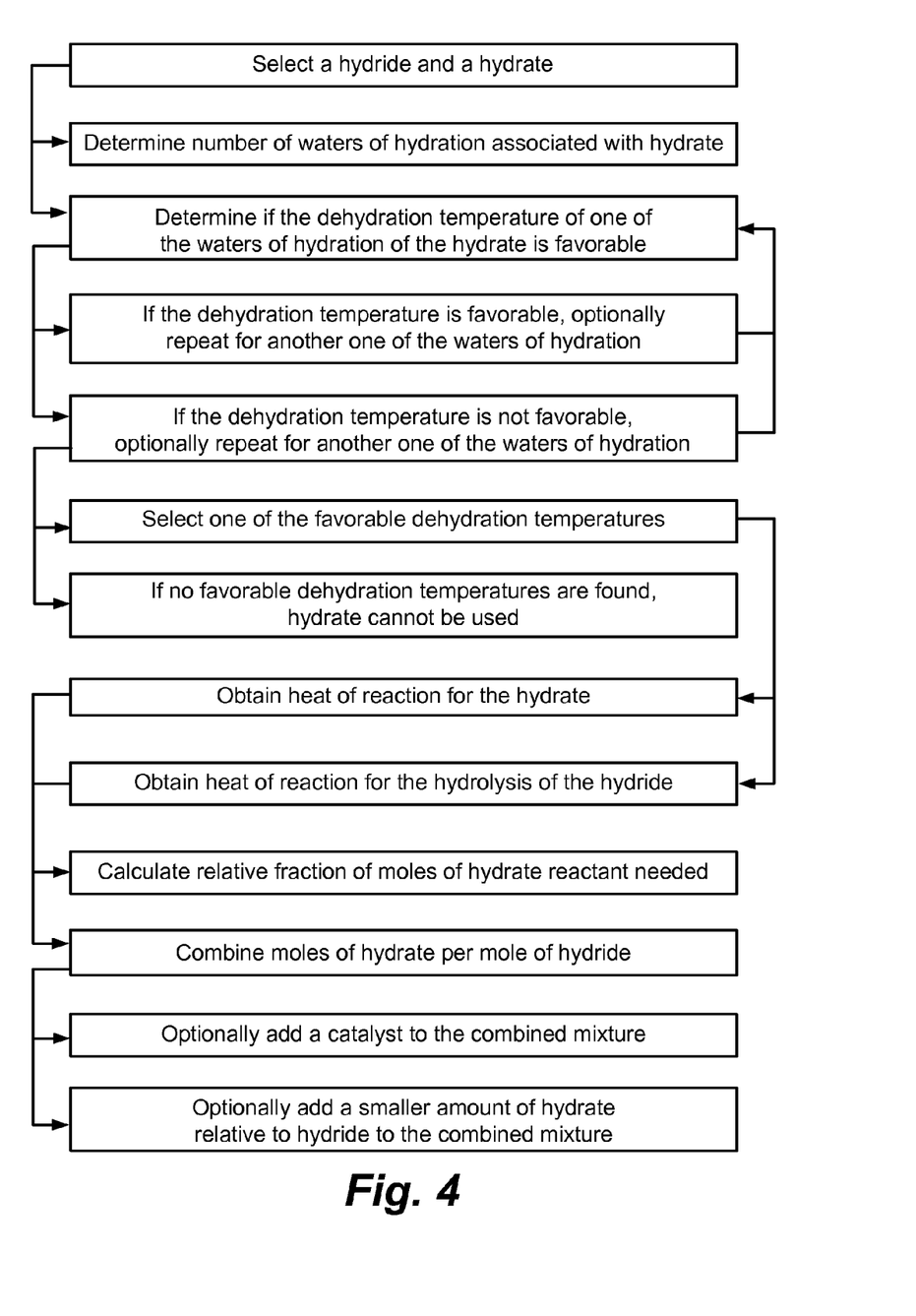
FIG. 4 shows a flow chart describing an example of a methodology for determining relative amounts of hydride and hydrate required to obtain generation of hydrogen gas at a moderated temperature.

A non-limiting example of one methodology of the present subject matter for selecting concentrations of reactants and moderated temperatures for generating hydrogen gas from any hydride/hydrate system is provided in FIG. 4.

The method shown in FIG. 4 can be used for selecting concentrations of reactants and moderated temperatures for generating hydrogen gas from any hydride/hydrate system, not limited to hydrides and hydrates described herein.

(1) Select a hydride and a hydrate. (2) Determine the number of waters of hydration associated with the hydrate. (3) Determine the dehydration temperature of one of the waters of hydration of the hydrate, and determine if that dehydration temperature is favorable or not-favorable for the selected hydrogen-generating conditions. (4) If the dehydration temperature found in (3) is favorable, then optionally repeat (3) for another one of the waters of hydration of the hydrate. (5) If the dehydration temperature found in (3) is not favorable, then the hydride/hydrate system cannot be used for generating hydrogen at that dehydration temperature, and then optionally repeat (3) for another one of the waters of hydration of the hydrate. (6) Select one of the favorable dehydration temperatures found for (3), (4), and (5) above. (7) If no favorable dehydration temperatures are found for (3), (4), and (5) then this hydride/hydrate combination cannot be used to generate hydrogen at a favorable temperature. (8) Obtain the heat of reaction for (a) the selected dehydration of the hydrate and (b) formation of total waters released by selected dehydration. Obtain the sum of (a)+(b) (given as positive enthalpy). (9) Obtain the heat of reaction for the hydrolysis of the hydride to generate hydrogen gas. This should be a negative number. (10) Calculate the fraction of moles of hydrate reactant needed to counterbalance the heat of hydrolysis from a mole of hydride reactant. (11) Combine the fraction of moles of hydrate per 1 mole of hydride to generate hydrogen gas at the selected dehydration temperature. (12) Optionally add a catalyst to the combined mixture of (11). One or more different catalysts may be optionally employed to catalyze the hydrolysis reaction. In certain embodiments, increasing the amount of catalyst will increase the rate of hydrolysis without significantly changing the phase transition temperature of the dehydration reaction. (13) Optionally, additional hydrate relative to hydride can be added to the combined mixture of (11) or (12) sufficient to raise the heat of reaction by a selected amount, such as, for example, by 0.1 kcal/mol. In some embodiments, a reaction temperature higher than the selected dehydration temperature can thus be selected and obtained by using a smaller amount of hydrate relative to the amount of hydride.

EXAMPLE 3

Figure 5:
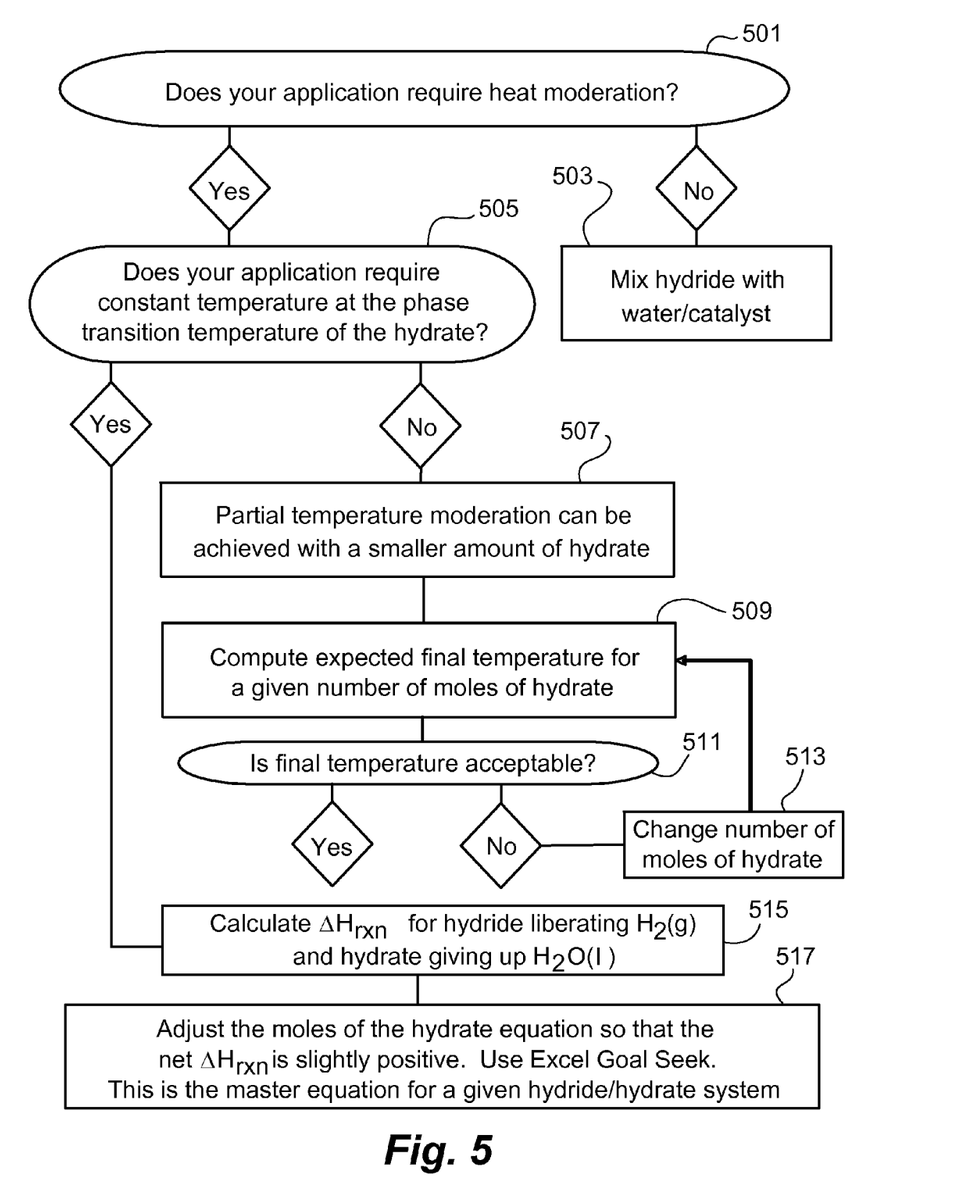
FIG. 5 shows a flow chart describing another example of a methodology for determining relative amounts of hydride and hydrate required to obtain generation of hydrogen gas at a moderated temperature.

Another non-limiting example of one methodology of the present subject matter for selecting concentrations of reactants and moderated temperatures for generating hydrogen gas from any hydride/hydrate system is provided in FIG. 5, and as described as follows.

First, does a given application using hydrogen generated from a hydride require heat moderation (501)? If (501) is yes, then does the application require maintaining a constant temperature at a moderate phase transition temperature of the hydrate (505)? If (505) is yes, then calculate the heats of reaction for: hydride liberating hydrogen gas and hydrate giving up water (515). After (515), then adjust the moles of the hydrate equation so that the net heat of reaction for the hydride/hydrate combination is slightly positive (517). If (505) is no, then partial temperature moderation can be achieved with a smaller amount of hydrate (507). After (507), then compute the expected final temperature for a given number of moles of hydrate (509). Is final temperature from (509) acceptable (511)? If (511) is yes, then use number of moles calculated in (509). If (511) is no, then change the number of moles of hydrate and repeat (509) and (511). Repeat (513) until final temperature is acceptable (511). A catalyst may be optionally added to the hydride/hydrate mixture.

EXAMPLE 4

This example relates to calculating the correct proportions of hydride/hydrate for a sodium borohydride/ferrous sulfate heptahydrate system with heat management. FeSO4.7H2O has a phase transition in the temperature range of interest, 30-90° C. The heptahydrate loses six waters to form the monohydrate at 64° C.; the monohydrate loses its final water to form the anhydrous form at about 300° C. Thus, the heptahydrate to monohydrate transition at 64° C. is of interest. Using the methods described herein, the master equation for relative amounts of hydride and hydrate is calculated:

14.1667 FeSO$_4$.7H$_2$O+3 NaBH$_4$→14.1667 FeSO$_4$.H$_2$O+79H$_2$O(l)+3 NaBO$_2$+12 H$_2$(g)
ΔH=1.035 kcal/mole        Eq. (8)

The calculation of ΔH includes the heat of formation of liberated waters as described in Table 3:

TABLE 3

| Number of moles | Component | Reactant or Product? | ΔH$_f$ at 25° C. of each component kcal/mole | Mole adjusted ΔH$_f$ kcal/mole | Balanced Reaction ΔH kcal/mole |
|---|---|---|---|---|---|
| 14.1667 | FeSO$_4$•7H$_2$O | R | −719.55 | −10191.97 | 10191.97 |
| 14.1667 | FeSO$_4$•H$_2$O | P | −294.21 | −4167.3 | −4167.3 |
| 3 | NaBH$_4$ | R | −43.82 | −131.46 | 131.46 |
| 3 | NaBO$_2$ | P | −253 | −759 | −759 |
| 12 | H$_2$(g) | P | 0 | 0 | 0 |
| 79 | H$_2$O(l) | P | −68.32 | −5397.07 | −5397.07 |
|  |  |  |  |  | 1.035 |

In conclusion, methods for generating hydrogen at moderated temperatures must take into account the heat of formation of liberated waters. The subject matter herein provides compositions and methodologies for taking into account the heat of formation of liberated waters to calculate the proportion of materials, i.e., hydride/hydrate, useful in preparing a hydrogen generator with heat management.

EXAMPLE 5

Figure 1:
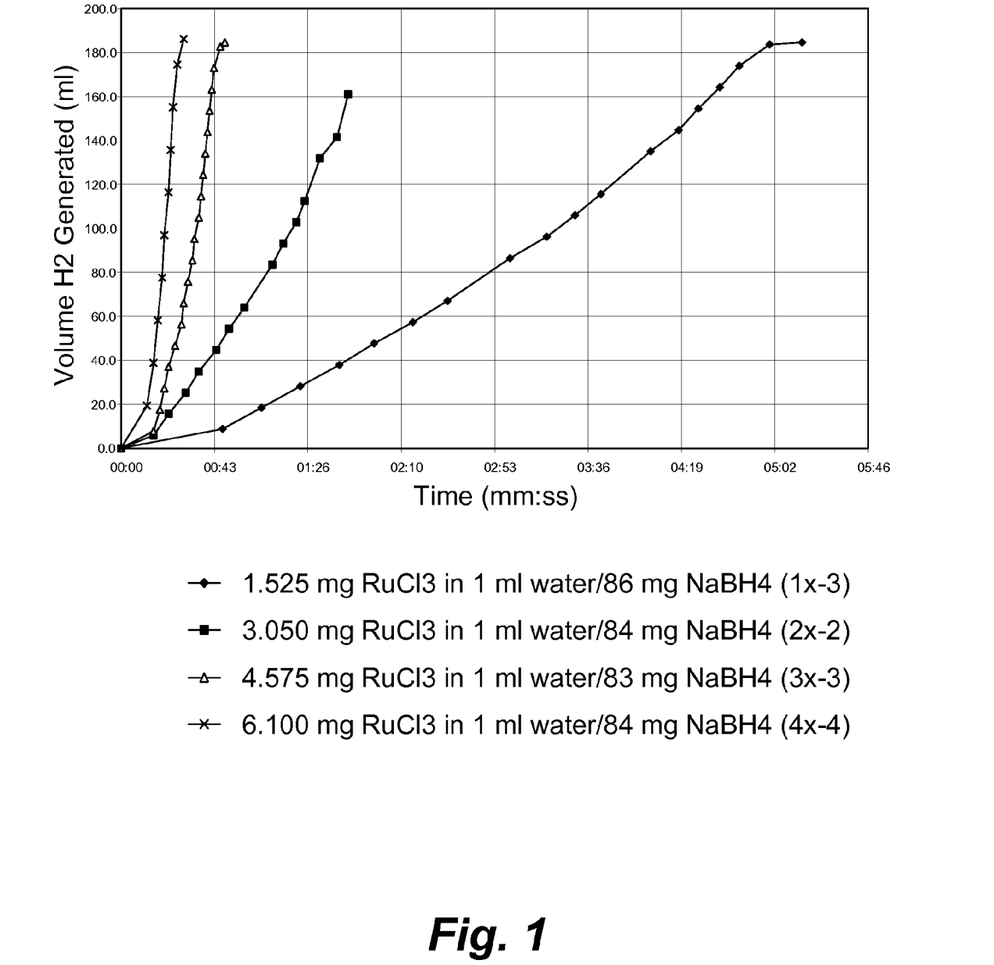
FIG. 1 shows an example of the measured volume of $H_2(g)$ generated as a function of time and catalyst concentration for $NaBH_4$ alone. These reactions are not temperature moderated.

This example relates to calculating the correct proportions of hydride/hydrate for a sodium borohydride/sodium sulfate decahydrate system with heat management. Sodium borohydride is well suited as a hydrogen generator in the present embodiment:

$$\text{NaBH}_4 + 2\ \text{H}_2\text{O(l)} \xrightarrow{cat.} \text{NaBO}_2 + 4\ \text{H}_2(g)\quad \Delta H = -72.5\ \text{kcal/mole} \qquad \text{Eq. (4)}$$

where the negative sign indicates heat released into the surroundings. FIG. 1 characterizes the rate of H$_2$(g) generation as a function of the wt % of catalyst. In this case, the catalyst is soluble ruthenium(III) chloride. The expectation is for the rate of H$_2$(g) production (at a constant temperature) to be a linear function of the wt % of the catalyst. This was not observed in this example. For example, from FIG. 1, a 4× increase in catalyst results in an apparent rate increase of more than 10 (300 sec to 28 sec for reaction completion). This is an indication that the temperature was not kept constant in these reactions for this example. Since the rate of a chemical reaction increases with increasing temperature, the reactions that ran faster also got hotter, further increasing the rate of reaction. The data was shown to be fully reproducible for a given catalyst concentration.

There are many reasons for using NaBH$_4$ as a hydrogen generator in the present embodiment. The reactants and products of the NaBH$_4$ reaction are environmentally friendly. The product sodium metaborate (NaBO$_2$) for example is a relative of borax. It is often used as a cleaner and as a constituent in proprietary water treatment systems. The reaction is controllable. NaBH$_4$ does not react with water unless activated by a catalyst or other agent. NaBH$_4$ stores H$_2$(g) efficiently. For example, a 30 wt % solution of NaBH$_4$ contains 6.4 wt % H$_2$(g). However, there is also a concern in using NaBH$_4$: considerable heat is given off by the reaction and heat management is required for use in applications such as an ECR where minimizing water vapor in the balloon is important to maintain lift.

This concern in using NaBH$_4$ can be overcome by combining the sodium borohydride with a hydrate which requires heat to release its water:

$$\text{NaBH}_4 + 2\ \text{H}_2\text{O(l)} \xrightarrow{cat.} \text{NaBO}_2 + 4\ \text{H}_2(g)\quad \Delta H = -72.5\ \text{kcal/mole} \qquad \text{Eq. (4)}$$

$$\text{Na}_2\text{SO}_4 \cdot 10\text{H}_2\text{O} \rightarrow \text{Na}_2\text{SO}_4 + 10\ \text{H}_2\text{O(l)}\quad \Delta H = 19.4\ \text{kcal/mole}$$

If the proportions of sodium sulfate decahydrate are adjusted properly so that there is an excess of the decahydrate, and the reactions added together, the net heat of reaction can be made to be slightly positive in the present embodiment:

NaBH$_4$+2 H$_2$O(l)→NaBO$_2$+4 H$_2$(g) ΔH=−72.5 kcal/mole 3.8 Na$_2$SO$_4$.10H$_2$O→3.8 Na$_2$SO$_4$+38 H$_2$O(l)
ΔH=73.7 kcal/mole 3.8 Na$_2$SO$_4$.10H$_2$O+NaBH$_4$→3.8 Na$_2$SO$_4$+36 H$_2$O(l)+NaBO$_2$+4 H$_2$(g) ΔH=1.2 kcal/mole     Eq. (9)

Choosing coefficients that result in a slightly positive heat of reaction provides added insurance that the temperature will remain at a constant level should local cool spots due to incomplete heat conduction in a loosely packed powder, or local hot spots due to inadequate mixing, occur. Furthermore, in additional embodiments, equation coefficients can be selected that result in a slightly positive heat of reaction in order to achieve a predetermined reaction temperature. In certain embodiments, there is complete heat management and the predetermined reaction temperature is at or near the phase transition temperature of the selected hydrate dehydration reaction. In other embodiments, there is partial heat management and the predetermined reaction temperature is above the phase transition temperature of the selected hydrate dehydration reaction. For example, the predetermined reaction temperature can be designed to be at the phase transition temperature of the selected hydrate dehydration reaction, or at a temperature ranging from 1 to 50° C. above the selected phase transition temperature. In some embodiments, the reaction temperature can be made to vary over a smaller temperature range, such as, for example, over a range of 5-20° C. above the selected phase transition temperature.

Figure 2:
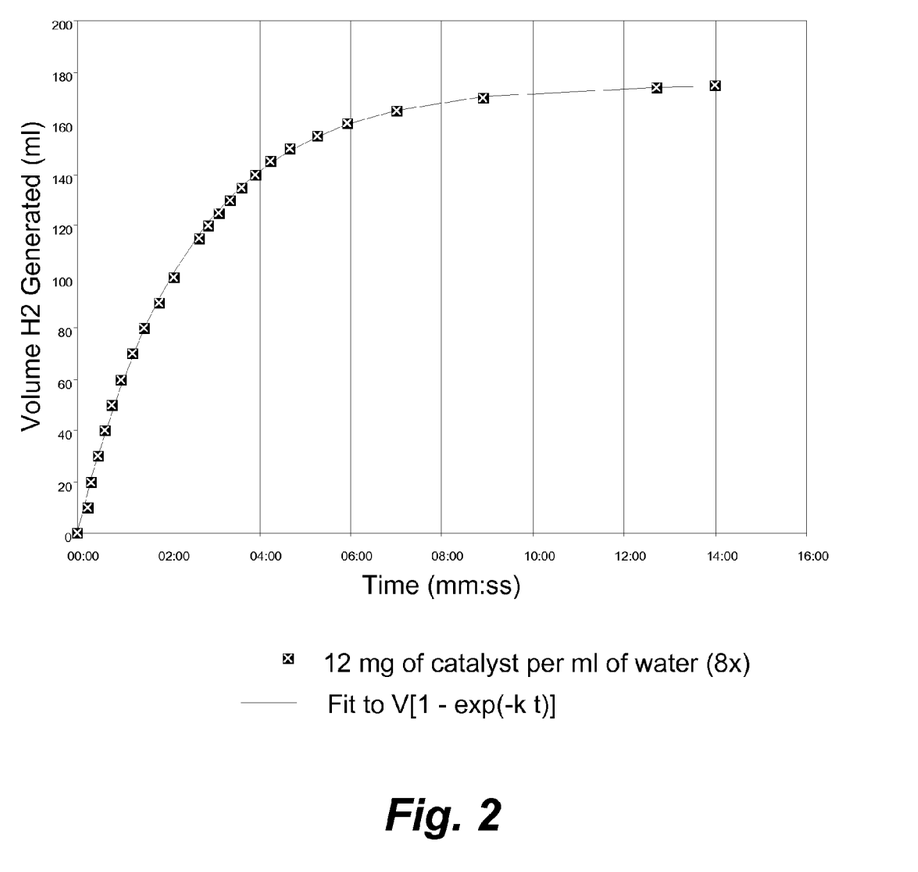
FIG. 2 shows an example of the measured volume of $H_2(g)$ generated as a function of time at a given catalyst concentration for the $NaBH_4/Na_2SO_4 \cdot 10H_2O$ combination. This reaction is temperature moderated.

FIG. 2 shows an example of the rate of $H_2(g)$ generation for the $NaBH_4/Na_2SO_4 \cdot 10H_2O$ combination at a given catalyst concentration following the molar proportions of hydride/hydrate calculated above for this system (Eq. (9)). The shape of this curve is dramatically different from the curve in FIG. 1 for $NaBH_4$ alone. At 9 minutes the curve has turned over significantly. This turnover is behavior that would be expected if the temperature remains constant where the rate of reaction is first order in the borohydride concentration (the rate decreases as borohydride is consumed). As an additional indicator of first-order behavior, the data was easily fit to the integrated first-order rate law written in the form of an exponential decay equation: $V=V_\infty(1-e^{-kt})$.

$Na_2SO4 \cdot 10H_2O$ has a definite advantage for the ECR application since dehydration takes place at a relatively low temperature, 32° C. Water vapor pressure is minimal at this temperature so that the balloon will not fill with water vapor which will condense to $H_2O(l)$ and reduce the lift of the balloon. It is important to note that although the overall $\Delta H$ of the hydride/hydrate reaction in Eq. (9) above is slightly positive, $\Delta G$ is negative resulting in a spontaneous reaction at 32° C. when catalyst dissolved in water is added.

Figure 3:
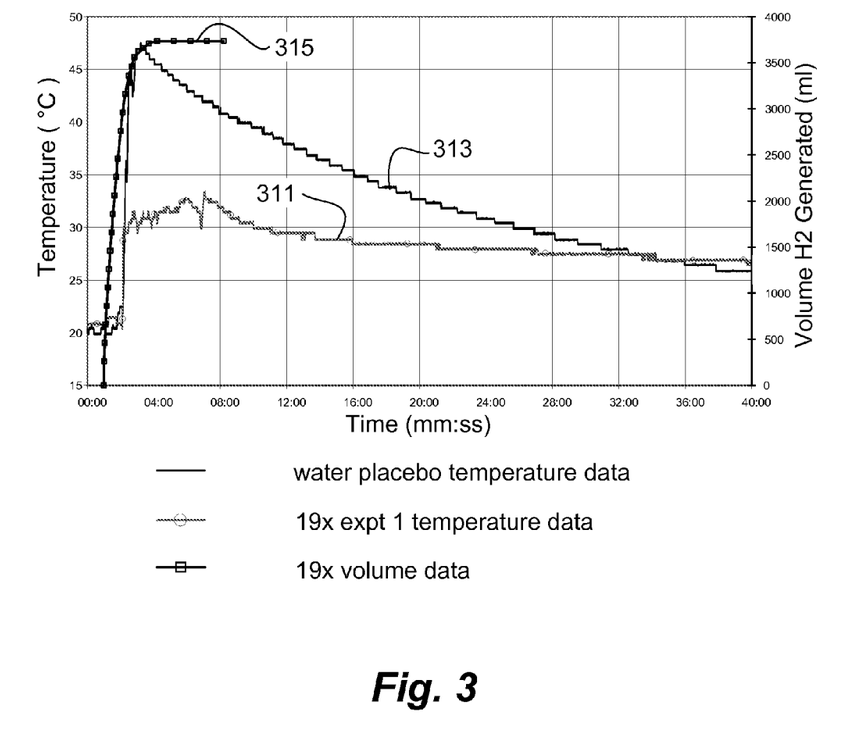
FIG. 3 shows an example of the measured temperature history (left axis) as a function of time at a given catalyst concentration for the $NaBH_4/Na_2SO_4 \cdot 10H_2O$ combination (311) and for the $NaBH_4$/water combination labeled "water placebo" (313). The reaction that reaches 47° C. and decays exponentially is not temperature moderated. The reaction in which the temperature remains stable at about 32° C. is temperature moderated. Volume of $H_2$ generated (right axis) as a function of time is shown (315) for the same $NaBH_4/Na_2SO_4 \cdot 10H_2O$ combination and catalyst concentration.

FIG. 3 shows an example of the measured temperature history (left axis) as a function of time at a given catalyst concentration for the $NaBH_4/Na_2SO_4 \cdot 10H_2O$ combination (311) and for the $NaBH_4$/water combination labeled "water placebo" (313). The reaction (313) that reaches 47° C. and decays exponentially is not temperature moderated. The reaction (311) in which the temperature remains stable at about 32° C. is temperature moderated. Volume of $H_2$ generated (right axis) as a function of time is shown (315) for the same $NaBH_4/Na_2SO_4 \cdot 10H_2O$ combination and catalyst concentration. FIG. 3 shows that for the $NaBH_4/Na_2SO_4 \cdot 10H_2O$ combination (311) the temperature remains constant at about 32° C. until the $NaBH_4$ is depleted. A placebo experiment (313) in which the 51.46 g of $Na_2SO_4 \cdot 10H_2O$ is replaced by water shows that the temperature spikes up to 47° C. and then decays exponentially in the absence of the hydrate. The hydrate in the $NaBH_4/Na_2SO_4 \cdot 10H_2O$ combination (311) has successfully moderated the temperature as it was undergoing a phase transition to the anhydrous form. In the $NaBH_4/Na_2SO_4 \cdot 10H_2O$ combination (311), the hydrate melted incongruently into 2 phases, a precipitate of anhydrous $Na_2SO_4$ plus a saturated solution of $Na_2SO_4$ in water. The volume data, taken in a separate experiment but using the same proportions of hydride/hydrate, substantiates the depletion point of the $NaBH_4$.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A hydrogen generator system comprising a hydride/hydrate combination, wherein the hydride/hydrate combination comprises a hydride that is physically mixed with a ratio of hydrate, water, and catalyst in such proportions that the system temperature is kept constant, or nearly constant, at or near a selected phase transition temperature of the hydrate within the range of 30-90° C. during generation of hydrogen gas by hydrolysis of the hydride, wherein the starting proportions of the hydride and the hydrate are determined based on calculations that take into account the heat of formation of liberated water molecules.

2. The hydrogen generator system according to claim 1 wherein the hydride/hydrate combination is $NaBH_4/Na_2SO_4 \cdot 10H_2O$, and wherein the ratio of moles of hydrate to moles of hydride is about 3.8:1.

3. The hydrogen generator system according to claim 1, wherein the hydride/hydrate combination is $NaBH_4/CoSO_4 \cdot 7H_2O$, and wherein the ratio of moles of hydrate to moles of hydride is about 5:1.

4. The hydrogen generator system according to claim 1 wherein the hydride/hydrate combination is $NaBH_4/FeSO_4 \cdot 7H_2O$.

5. The hydrogen generator system according to claim 4 wherein the ratio of moles of hydrate to moles of hydride is about 14.2:3.

6. The hydrogen generator system according to claim 1 wherein the hydride is selected from the group consisting of the groups I, II, and III metal hydrides and borohydrides.

7. The hydrogen generator system according to claim 1 wherein the hydrate is selected from the group consisting of $AlNH_4(SO_4)_2 \cdot 12H2O$, $AlF_3 \cdot 3H2O$, $AlK(SO_4)_2 \cdot 12H_2O$, $Al_2(SO_4)_3 \cdot 18H_2O$, $Co(OOCCH_3)_2 \cdot 4H2O$, $CoBr_2 \cdot 6H_2O$, $CoCl_2 \cdot 6H_2O$, $CoSO_4 \cdot 7H_2O$, $FeSO_4 \cdot 7H_2O$, $MgSO_4 \cdot 7H_2O$, $NiSO4 \cdot 6H_2O$, $NaBO_2 \cdot 4H_2O$, $Na_3PO_4 \cdot 12H_2O$, $Na_2SO_4 \cdot 10H_2O$, $Na_2S_2O_3 \cdot 5H_2O$, $CuSO_4 \cdot 5H_2O$, and $Cu(NO_3)_2 \cdot 6H_2O$.

8. The hydrogen generator system according to claim 2 wherein the system temperature is kept at about 32 degrees Celsius.

9. The hydrogen generator system according to claim 1 wherein the hydride/hydrate combination comprises soluble ruthenium(III) chloride as the catalyst.

10. The hydrogen generator system according to claim 1 wherein the system further comprises at least one additional hydride, at least one additional hydrate, or a combination thereof.

11. The hydrogen generator system according to claim 1 wherein the mole ratio of hydrate:hydride is chosen such that the temperature of the system is not allowed to rise more than 1 to 10° C. above the selected phase transition temperature of the hydrate during the generation of hydrogen gas during the hydrolysis of the hydride.

12. A method for generating hydrogen gas from a hydrogen source composition at a predefined temperature range comprising:
  selecting at least one hydride and at least one hydrate;
  determining the number of water molecules that can be removed from the hydrate at or below the predefined temperature range;
  calculating the total heat of dehydration involved in removing the water molecules from the hydrate at or below the predefined temperature range, wherein the calculation of the total heat of dehydration takes into account the heat of formation of liberated water molecules;
  calculating the total heat of hydrolysis involved in removing the hydrogen from the hydride during hydrolysis;

calculating the relative amounts of reactant hydride and reactant hydrate needed to balance the total heat evolved by the dehydration reaction and total heat used by the hydrolysis reaction;

combining the at least one hydride and at least one hydrate in the relative amounts calculated for balancing the heats of dehydration and hydrolysis; and generating hydrogen gas.

13. The method according to claim 12, wherein the at least one hydride is selected from the group consisting of the groups I, II, and III metal hydrides and borohydrides.

14. The method according to claim 12, wherein the at least one hydrate is selected from the group consisting of $AlNH_4(SO_4)_2.12H2O$, $AlF_3.3H2O$, $AlK(SO_4)_2.12H_2O$, $Al_2(SO_4)_3.18H_2O$, $Co(OOCCH_3)_2.4H_2O$, $CoBr_2.6H_2O$, $CoCl_2.6H_2O$, $CoSO_4.7H_2O$, $FeSO_4.7H_2O$ $MgSO_4.7H_2O$, $NiSO4.6H_2O$, $NaBO_2.4H_2O$, $Na_3PO_4.12H_2O$, $Na_2SO_4.10H_2O$, $Na_2S_2O_3.5H_2O$, $CuSO_4.5H_2O$, and $Cu(NO_3)_2.6H_2O$.

15. The method according to claim 12, wherein the hydride/hydrate combination also comprises at least one catalyst.

16. The method according to claim 15, wherein the hydride/hydrate combination comprises soluble ruthenium (III) chloride as the catalyst.

17. The method according to claim 12, further comprising calculating the relative amounts of reactant hydride and reactant hydrate needed to achieve a predetermined final temperature of the system above the temperature of the highest selected dehydration reaction.

18. The method according to claim 17, wherein relative amounts of reactant hydride and reactant hydrate are selected to achieve a predetermined final temperature of the system ranging from about 1° C. to 10° C. above the temperature of the highest selected dehydration reaction.

19. The method according to claim 17, wherein relative amounts of reactant hydride and reactant hydrate are selected to achieve a predetermined final temperature of the system ranging from about 10° C. to 30° C. above the temperature of the highest selected dehydration reaction phase transition.

20. A method for generating hydrogen gas from a hydrogen source composition at a predefined temperature range comprising the following steps:

(1) selecting a hydride/hydrate combination;

(2) determining the number of waters of hydration associated with the hydrate;

(3) determining a dehydration temperature of a given water of hydration of the hydrate and determining if the corresponding dehydration temperature is within the predefined temperature range;

(4) repeating step (3) for every water of hydration of the hydrate;

(5) repeating steps 1-4 if none of the dehydration temperatures determined in steps 3-4 are within the predefined temperature range;

(6) selecting one of the waters of hydration having a selected dehydration temperature within the predefined temperature range;

(7) obtaining a heat of reaction for (a) the dehydration of the selected water of hydration of the hydrate and for (b) the formation of liberated waters released by the dehydration of the selected water of hydration;

(8) calculating the sum of the heats of reaction (a) & (b) and providing the sum as a positive enthalpy;

(9) obtaining a heat of reaction for the hydrolysis of the hydride to generate hydrogen gas;

(10) calculating the fraction of moles of hydrate reactant needed to counterbalance the heat of hydrolysis from a mole of hydride reactant; and (11) combining the fraction of moles of hydrate per 1 mole of hydride into a mixture to generate hydrogen gas at the selected dehydration temperature.

21. The method of claim 20, further comprising the step of adding at least one catalyst to the combined mixture of step 11.

* * * * *